(Model.)

O. J. MILLER.
GATE.

No. 259,330. Patented June 13, 1882.

WITNESSES
John A. Ellis.
James J. Sheehy.

INVENTOR
O. J. Miller,
by Anderson & Smith
his ATTORNEYS

UNITED STATES PATENT OFFICE.

ORLANDO J. MILLER, OF PIQUA, OHIO.

GATE.

SPECIFICATION forming part of Letters Patent No. 259,330, dated June 13, 1882.

Application filed September 29, 1881. (Model.)

*To all whom it may concern:*

Be it known that I, ORLANDO J. MILLER, a citizen of the United States, and a resident of Piqua, in the county of Miami and State of Ohio, have invented a new and valuable Improvement in Gates; and I do hereby declare that the following is a full, clear, and exact description of the construction and operation of the same, reference being had to the annexed drawings, making a part of this specification, and to the letters and figures of reference marked thereon.

Figure 1:
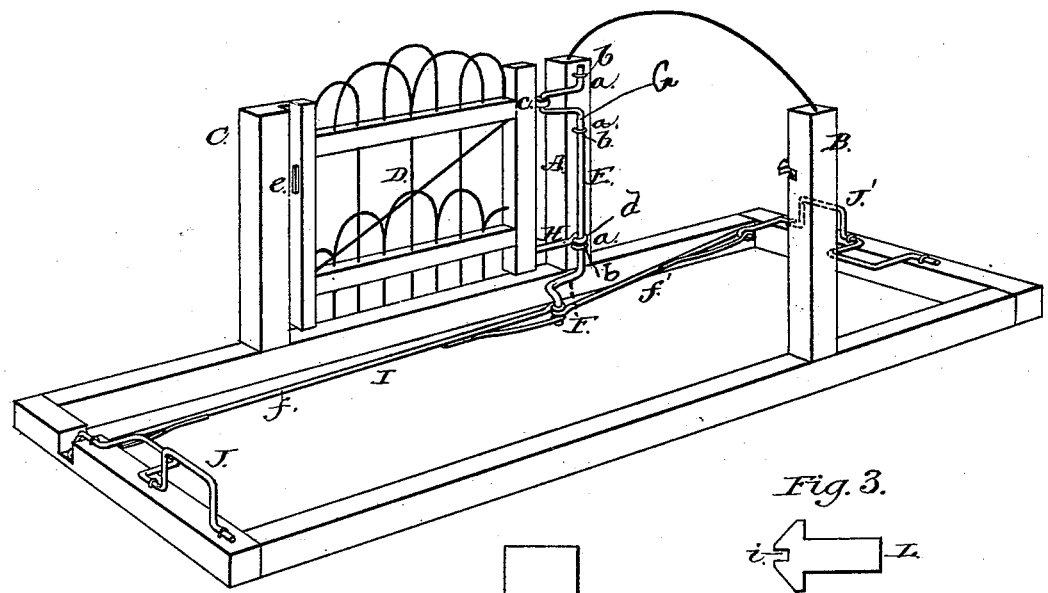
Figure 3:
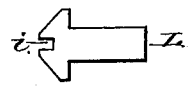
Figure 2:
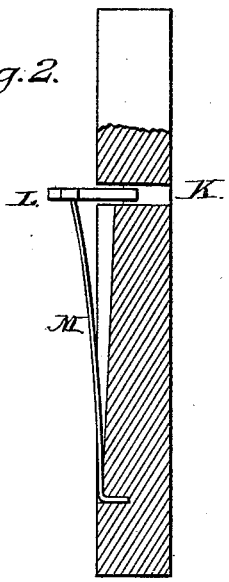

Figure 1 of the drawings is a representation of a perspective view of a gate embodying my improvement. Figs. 2 and 3 show details of the latch.

This invention has relation to automatic or self opening and closing gates; and it consists in the novel construction and arrangement of the gate, the posts, the draft-rods and treadles, the crank and top hinge, as will be hereinafter fully described, and particularly pointed out in the claim.

Referring by letter to the accompanying drawings, A designates the hinge-post, B the latch-post, and C the stop-post, arranged in triangular form.

D designates the gate. A rod, E, having a crank, F, at its lower end, curved as shown, and a double crank, G, near its upper end to form the top hinge, is provided with shoulders $a\ a\ a$, and is connected with the hinge-post A by eyebolts $b\ b\ b$. The gate D is connected to the top hinge or double crank G by an eyebolt, $c$.

An arm, H, having an eye, $d$, for the passage of the rod E, is screwed into the rear edge of the gate D, at its lower end, and the eye $d$ rests and turns upon the lower eye, $b$, in the hinge-post A.

The front edge of the gate is provided with a catch, $e$.

A jointed draft-rod, I, made in two sections, $f f'$, is connected to the lower end of the crank F upon the rod E, and is also connected with the treadles or double cranks J J', located at opposite sides of the gate, as shown.

The latch-post B is recessed and mortised at K to receive a T-shaped keeper, L, secured to the upper end of a vertical spring, M, let into a groove in the inner face of the latch-post B, the normal tendency of the catch being to project from the recess, as shown. The keeper will, however, yield to the pressure of the catch until the latter enters the notch $i$ in the keeper, when the gate will be closed.

When the wheel of the vehicle strikes either of the treadles they operate the draft-rods, and through them the crank F and rod E are operated, the top hinge or double crank G raises the gate, and it swings around to the stop-post. The vehicle may then pass through the open gate, and after having passed the wheel striking the upturned treadle on the other side of the gate will operate the rods and crank to close the gate.

The advantages of the gate are obvious from the foregoing description when taken in connection with the accompanying drawings.

Having thus fully described my invention, what I claim as new, and desire to secure by Letters Patent, is—

In an automatic gate, the combination of the rod E, having the lower crank, F, and the double crank G near its upper end, forming the top hinge, with the gate, hinge-post, eyebolts, and draft-rods operated by treadles, substantially as specified.

In testimony that I claim the above I have hereunto subscribed my name in the presence of two witnesses.

ORLANDO J. MILLER.

Witnesses:
LUTHER DEVENNEY,
DAVID MUNSON.